US006694649B2

(12) United States Patent
Whited et al.

(10) Patent No.: US 6,694,649 B2
(45) Date of Patent: Feb. 24, 2004

(54) MOTOR DRIVEN KNIFE INCLUDING DEPTH LIMITING DEVICE

(75) Inventors: Jeffrey A. Whited, Amherst, OH (US); Robert L. Leimbach, Wakeman, OH (US); Robert R. Bolin, Loveland, CO (US)

(73) Assignee: Bettcher Industries, Inc., Birmingham, OH (US)

( * ) Notice: Subject to any disclaimer, the term of this patent is extended or adjusted under 35 U.S.C. 154(b) by 127 days.

(21) Appl. No.: 10/045,254

(22) Filed: Nov. 7, 2001

(65) Prior Publication Data

US 2003/0084576 A1 May 8, 2003

(51) Int. Cl.[7] .............................................. A22C 17/00
(52) U.S. Cl. ........................... 36/276; 30/293; 452/134
(58) Field of Search ..................... 30/276, 286, 293, 30/282; 452/125, 132, 133, 134, 149

(56) References Cited

U.S. PATENT DOCUMENTS

| 390,105 A | | 9/1888 | Warth | |
|---|---|---|---|---|
| 652,133 A | | 6/1900 | Muller | |
| 3,274,889 A | | 9/1966 | Ferris | |
| 3,688,403 A | * | 9/1972 | Bettcher | ..................... 30/276 |
| 3,877,146 A | | 4/1975 | Pittinger | |
| 4,001,936 A | | 1/1977 | Matsushita | |
| 4,095,341 A | | 6/1978 | Crain | |
| 4,142,291 A | | 3/1979 | Bettcher | |
| 4,166,317 A | | 9/1979 | Bettcher | |
| 4,175,321 A | | 11/1979 | Bettcher | |
| 4,178,683 A | | 12/1979 | Bettcher | |
| 4,186,461 A | | 2/1980 | Leining | |
| 4,492,027 A | | 1/1985 | Bettcher | |
| 4,516,323 A | | 5/1985 | Bettcher et al. | |
| 4,575,937 A | * | 3/1986 | McCullough | ................ 30/276 |
| 4,575,938 A | | 3/1986 | McCullough | |
| 4,637,140 A | | 1/1987 | Bettcher | |
| 4,858,321 A | | 8/1989 | McCullough | |
| 5,484,331 A | | 1/1996 | Buhlke | |
| 5,522,142 A | * | 6/1996 | Whited | ........................ 30/276 |
| 5,664,332 A | * | 9/1997 | Whited et al. | ................ 30/276 |

FOREIGN PATENT DOCUMENTS

WO  WO 01/24977 A2  4/2001

* cited by examiner

Primary Examiner—Hwei S. C. Payer
(74) Attorney, Agent, or Firm—Watts Hoffman Co., L.P.A.

(57) ABSTRACT

A rotary knife comprising, an annular blade having a central axis, a blade supporting head assembly supporting the blade for rotation about the axis, a manually grippable handle assembly connected to the head assembly, and a flex shaft drive transmission for driving the blade about the axis. A depth of cut limiting device engages material as an operator moves the rotary knife across a surface to trim material from that surface. The depth of cut limiting device has particular utility in trimming fat from meat while leaving a controlled thickness of fat on the meat.

32 Claims, 10 Drawing Sheets

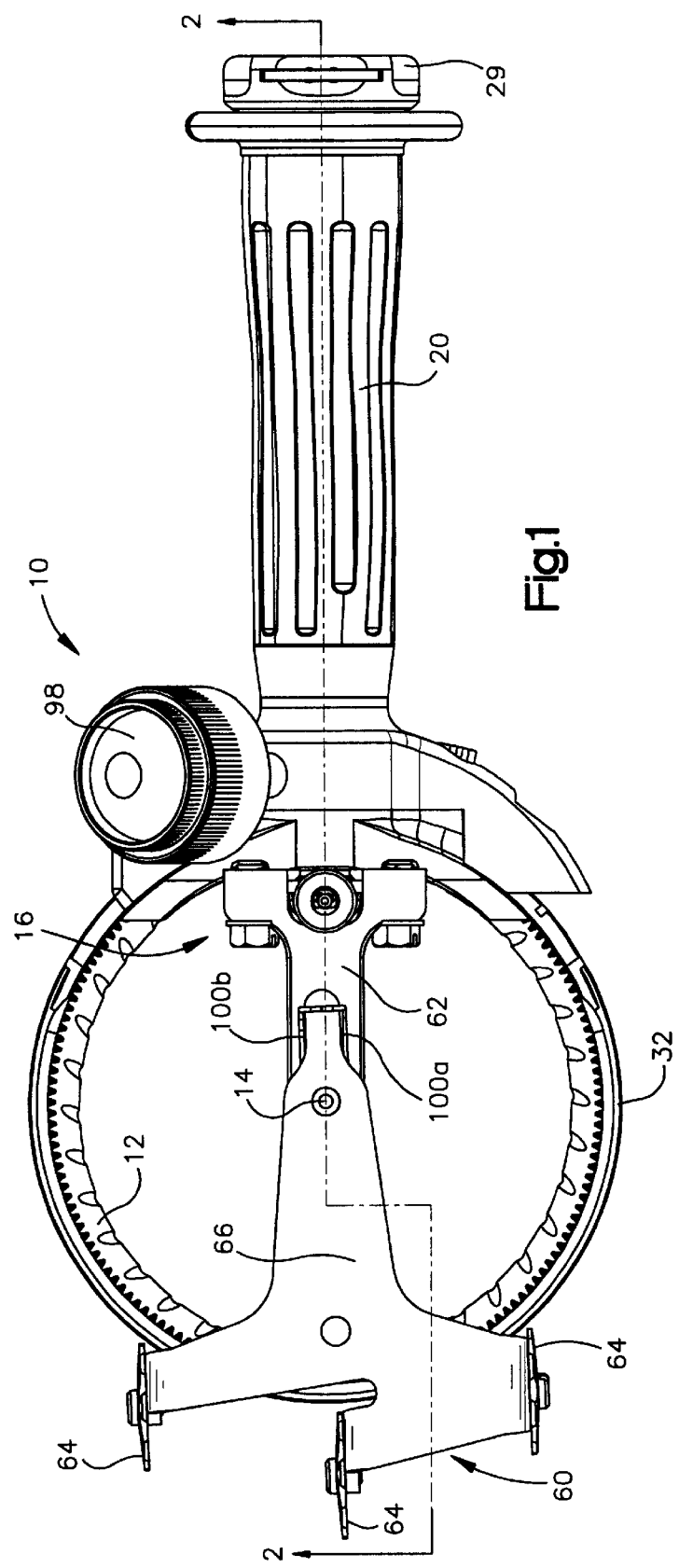

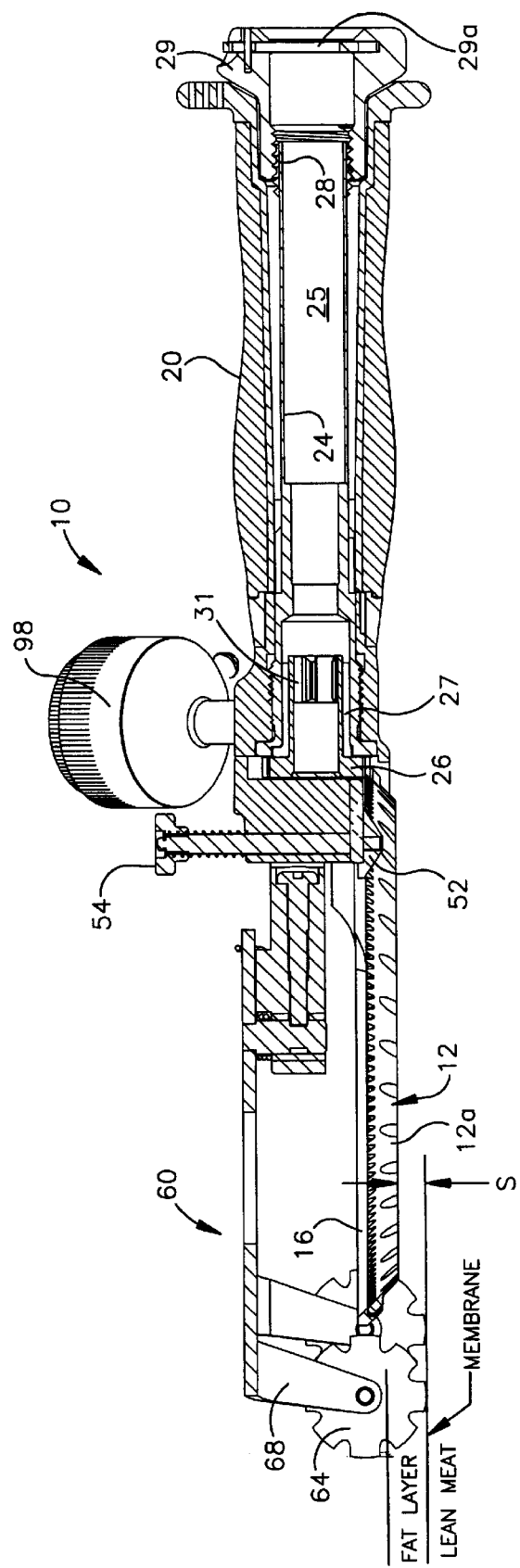

US 6,694,649 B2

MOTOR DRIVEN KNIFE INCLUDING DEPTH LIMITING DEVICE

FIELD OF THE INVENTION

The present invention relates to a power operated knife that includes a depth limiting attachment for controlling a thickness of fat covering that is left on a piece of meat.

BACKGROUND OF THE INVENTION

Power operated knives have been used in commercial meat processing operations to trim fat and connective tissue from meat, trim pieces of meat from bones, and to produce meat slices. Such knives are often constructed so that they are driven via a long flexible drive shaft. The knife operator wields the knife relatively freely at a meat cutting workstation that is remote from the driving motor.

One example of a prior art rotary knife is disclosed in a PCT patent application published on Apr. 12, 2001 under publication number WO 01/24977 A2. This published PCT application is entitled "Power Operated Rotary Knife".

The rotary knife disclosed in this PCT published application has a depth-of-cut controlling gauge whose position can be adjusted relative to the blade. The gauge is detachably connected to a clamp assembly that holds the blade in place so that the gauge may be removed if the operations to be performed by the knife do not require a cut-thickness gauge. The gauge includes an annular gauge unit that comes in contact with the meat that is being sliced to limit the depth to which the rotary blade will enter the meat as the user moves the knife through the meat.

The depth gauge in the above referenced PCT published application is mounted to contact the meat within the inside diameter of the knife blade. The gauge rests on the outer layer of fat or meat. This gauge controls how far the blade will penetrate the surface of the meat thereby controlling how much material is removed from the outside surface of the product. It does not result in the blade following the meat contour underneath a fat layer on the meat.

U.S. Pat. No. 5,484,331 to Buhlke entitled "Method and Device for Hot Fat Trimming" concerns a trimming knife for retaining a predetermined thickness of fat on a carcass or piece of meat. A guide attached to the knife contacts meat and is capable of compressing fat to the surface of the meat but not into the meat. However, the fat is being compressed therefore the thickness of the fat remaining is dependent on the thickness of the compression.

SUMMARY OF THE INVENTION

The present invention provides a new and improved motor driven knife that includes a depth of cut limiting attachment for controlling a thickness of material remaining as a motor driven knife blade is moved over a surface.

One embodiment of the invention includes a motor operated knife having a blade that defines a cutting edge that extends along at least a portion of the blade. A blade support assembly supports the blade for movement as the blade is brought into contact with an exposed surface of a material. A manually grippable handle assembly supports the blade thereby allowing an operator to orient and move the blade to cut material away from the exposed surface. A drive transmission engages the blade for driving said blade during manipulation of the knife. The knife also includes a cut depth-limiting device that is mounted for movement with the handle assembly during manipulation of the knife. The depth-limiting device includes one or more prongs that enter the material during operation of the knife to limit a depth to which the blade enters the material.

Practice of the present invention produces a consistent and uniform thickness of fat coverage on the exterior of a meat cut even if the surface is non-uniform before trimming is commenced. The depth-limiting device penetrates an outer fat cover until the device encounters a membrane between the fat and lean meat. The limiting device holds the knife blade at a predetermined height above this membrane. The limiting device will follow the contour of the membrane allowing the knife to leave a consistent thickness of fat on the meat cut or animal carcass.

An exemplary embodiment of the invention is used in conjunction with a rotary driven knife having a generally circular blade. This knife has special utility for trimming fat from a piece of meat. This use of the invention provides the desired effect of allowing a user to trim fat from recently slaughtered meat while leaving a controlled thickness of fat on the meat.

Additional features and advantages of the invention will become apparent from the following description of a preferred embodiment made with reference to the accompanying drawings, which form part of the specification.

BRIEF DESCRIPTION OF THE DRAWINGS

FIG. 1 is a top plan view of a knife constructed according to the invention;

FIG. 2 is a cross sectional view seen approximately from the plane indicated by the line 2—2 of FIG. 1;

DESCRIPTION OF THE BEST MODE CONTEMPLATED FOR PRACTICING THE INVENTION

Figure 1A:
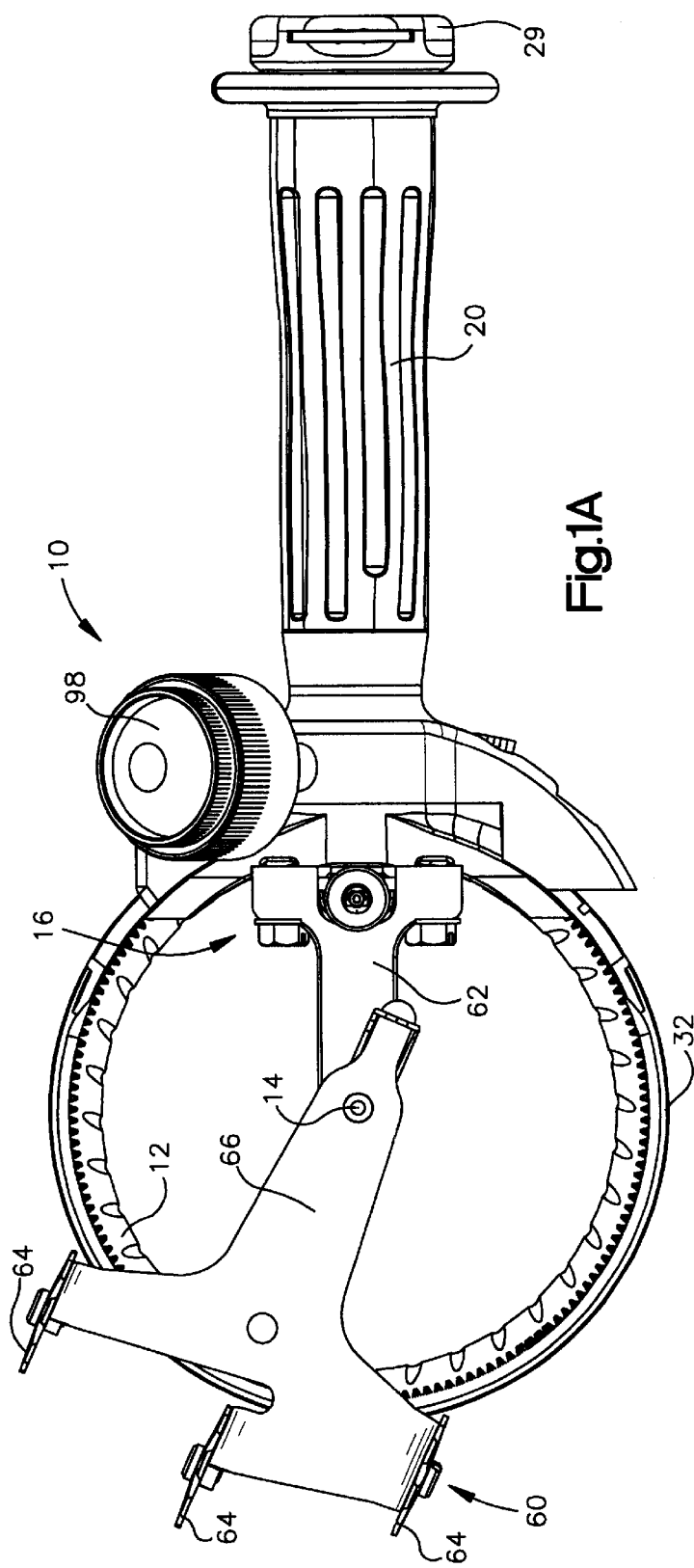
FIG. 1A is a top plan view of the FIG. 1 knife showing a depth limiting attachment pivoted to the side.

A power operated rotary knife 10 embodying the invention is illustrated by the drawings. The knife 10 comprises an annular blade 12 that is mounted for rotation about a central axis 14 by a blade support assembly 16. A user or operator manipulates the blade by grasping a handle assembly 20 connected to the blade support assembly 16 and bringing the rotating blade 12 into contact with a material such as an exposed surface of a piece of meat.

The blade 12 is rotated by a motor located a distance from the knife. The motor is coupled to the blade by means of an elongated flexible blade drive 22 (FIG. 12) that extends into the handle assembly 20 at an end of the handle assembly spaced from the blade 12. The flexible blade drive 22 is supported within a liner 24 having a passageway 25 which extends through the handle assembly. An end of the flexible blade drive 22 is coupled to a blade driving pinion gear 26 rotatably supported in a sleeve bearing 27 shown most clearly in FIG. 3. The liner 24 includes a threaded end 28 that engages a correspondingly threaded end cap 29 that holds the handle assembly 20 in place during operation of the knife 10. Different operators use the knife so that different handle assemblies can be interchanged with each other by removing the end cap 29 and substituting a different handle assembly 20.

Figure 3:
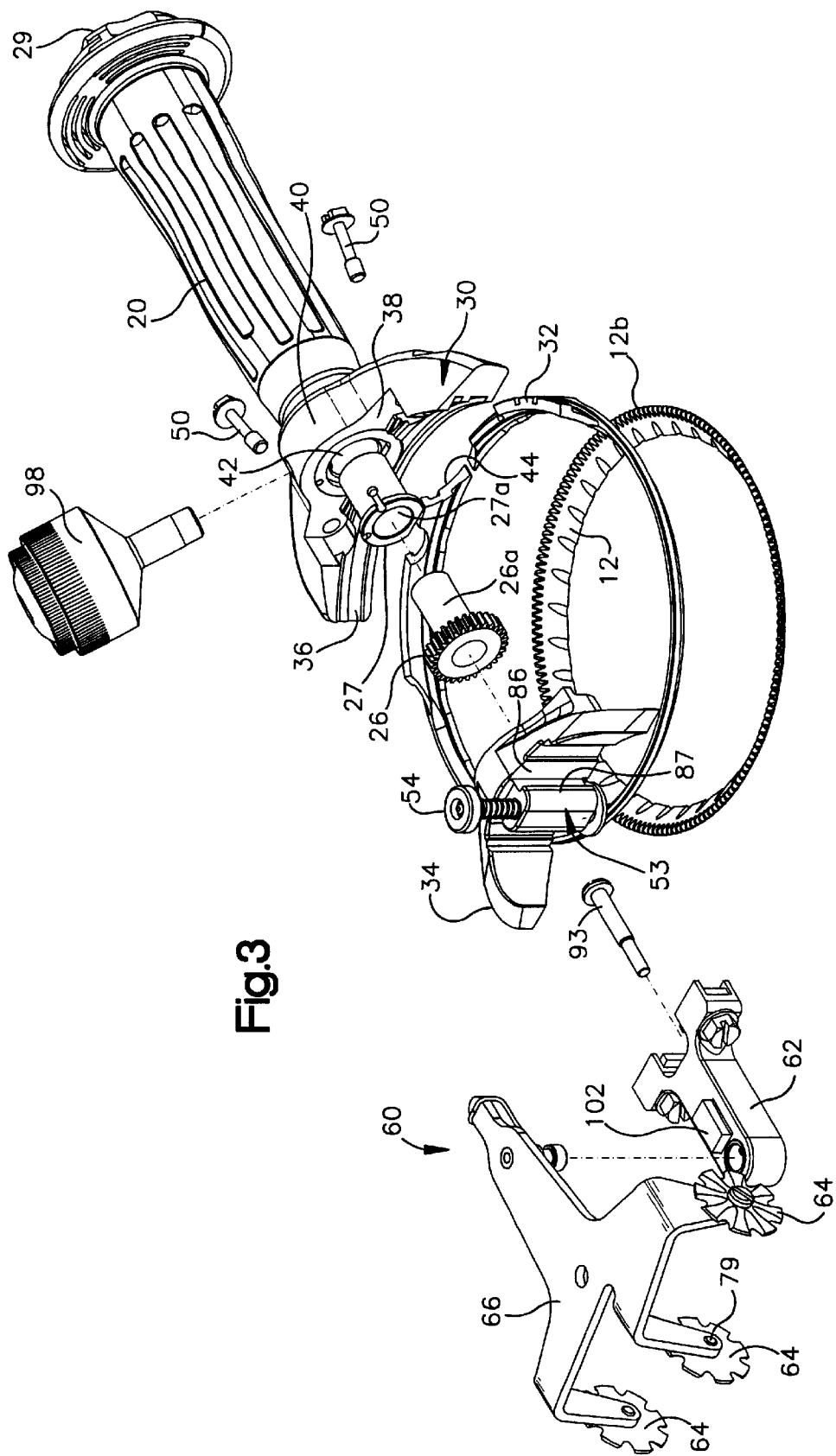
FIG. 3 is an exploded perspective view of part of the knife of FIG. 1 having a depth limiting attachment.

The blade 12 may be of any suitable or conventional construction and includes an annular blade section 12a projecting from the blade support assembly 16 and an annular enlarged body section defining a ring gear 12b (see FIG. 3). The ring gear 12b has axially extending teeth by which the blade 12 is driven about the axis 14 in mesh with corresponding teeth of the pinion gear 26.

The blade support assembly 16 supports the blade 12 for movement with the handle assembly 20 as a user moves the knife 10. The blade support assembly 16 includes a head member 30, a blade housing 32, and a clamp assembly 34 for securing the blade and blade housing to the head member. The head member 30 is illustrated as formed by a generally crescent shaped body having a semicircular seating region 36 confronting the blade housing, a rectilinear clamp assembly receiving socket 38 adjacent the seating region, and an enlarged boss 40 that defines a through bore 42 to receive the sleeve bearing 27.

The blade housing 32 is an annular member for receiving, and rotatably supporting, the blade 12. The blade housing is split to enable it to expand for removing and replacing the blade 12. The illustrated blade housing is seated against the head member seating region 36 and positions the blade 12 so that the ring gear 12b is accurately positioned for being driven from the pinion gear 26. The blade housing defines a semicircular cutout area 44 that receives the pinion gear 26 when the pinion gear and ring gear 12b mesh.

Additional details concerning the blade housing 32 and the means of supporting the blade within the housing are disclosed in the published PCT application WO 01/24977 referenced above.

The through bore 42 in the head member 30 is sized to accommodate the sleeve bearing 27 which seats within the head member 30 and which has a center throughbore 27a to accept the pinion gear 26. The pinion gear rotates within the sleeve bearing 27 and includes a shaft portion 26a having a splined interior passageway 31 which mates with an end of the flexible drive 22 which imparts rotation to the pinion gear 26.

The pinion gear is held in place by the clamp assembly 34. This clamp assembly 34 has two threaded openings, which face the head member 30. Threaded connectors 50 pass through the head member 30 and engage these threaded openings in the clamp assembly 34 to secure the clamp assembly to the head member 30. When so secured the clamp assembly fixes the pinion gear 26 and blade housing to the head assembly so that the pinion gear 26 is aligned with the teeth of the blade's ring gear 12b.

A blade straightening steel 52 is supported by the clamp assembly 34 in spaced relation to the blade. This steel is connected to a button actuator 54 mounted to a steel support body 53. By depressing the actuator 54 a beveled surface of the steel 52 is brought into contact with the blade 12 to periodically straighten a circular cutting edge of the blade.

The knife 10 depicted in the drawings includes a cut depth limiting attachment 60. This attachment includes a mounting assembly 62 that is adapted to be connected to a mounting surface of the knife's clamp assembly 34. A number of depth of cut limiting gauges 64 are connected to a base 66 pivotally connected to the mounting assembly 62 for rotation about an axis of rotation that generally coincides with the axis of rotation 14 of the blade. In the embodiment illustrated in FIGS. 1–4 the base 66 includes three gauge mounting arms 68 that extend from the base 66 at positions so that the gauges 64 contact the meat beyond the circumference of the blade 12.

In the disclosed embodiment, the gauges 64 are wheels that attach to the arms 68 and come into contact with the material contacted by the blade 12 during operation of the rotary knife 10. One use of the depth limiting attachment 60 is for controlling the depth of fat that is left on a piece of meat as the knife slices through the exterior surface of fat on a cut of meat or an animal carcass.

Figure 5:
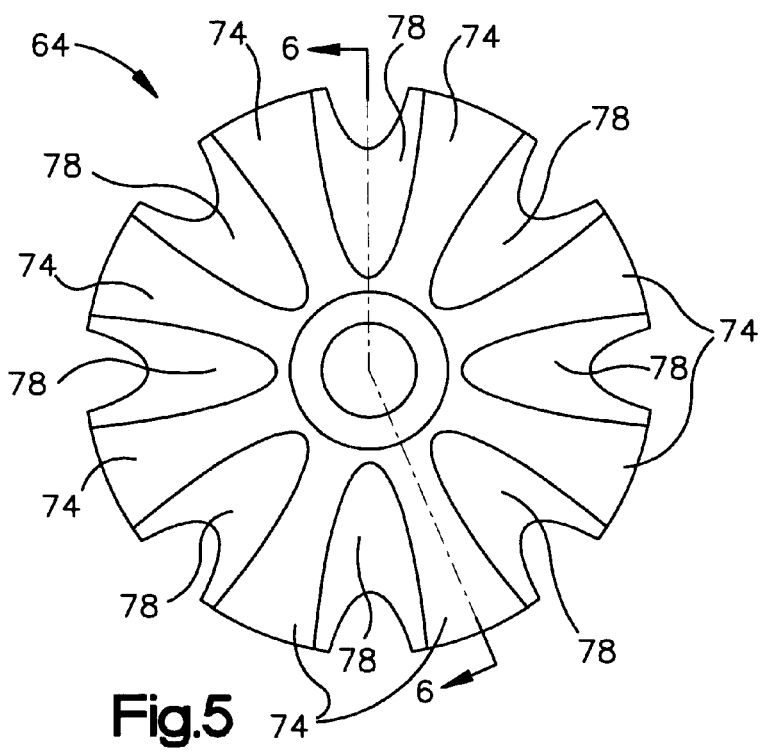
FIG. 5 is an elevation view of a rotatably mounted wheel that forms a part of the depth limiting attachment.
Figure 6:
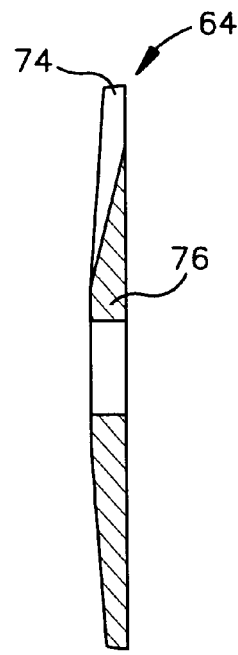
FIG. 6 is a section view as seen from the view 6—6 of FIG. 5.

In accordance with the disclosed embodiment of the invention the gauges 64 are formed by metal wheels rotatably supported by the base 66 that include radially extend prongs 74 that contact the meat as the circular knife blade cuts into the meat. As seen in FIGS. 5 and 6 the wheels comprise a relatively thick center hub section 76 and a series of circumferentially spaced apart lands that form the prongs which extend outwardly from the hub section to an outer diameter of the wheel. The wheels taper from the relatively thick center hub section 76 to a smaller thickness at the outer diameter of the wheel. The wheels also define spaced apart cutouts 78 which separate adjacent lands from each other around the periphery of each wheel. The cutouts 78 form notches in the outer diameter of the wheels that cut into the fat allowing the outer diameter to contact the meat's silver skin layer. The hub section of each wheel engages a screw 79 which acts as a bearing and supports a wheel for rotation as the knife is moved relative to a piece of meat which is being trimmed.

Figure 4:
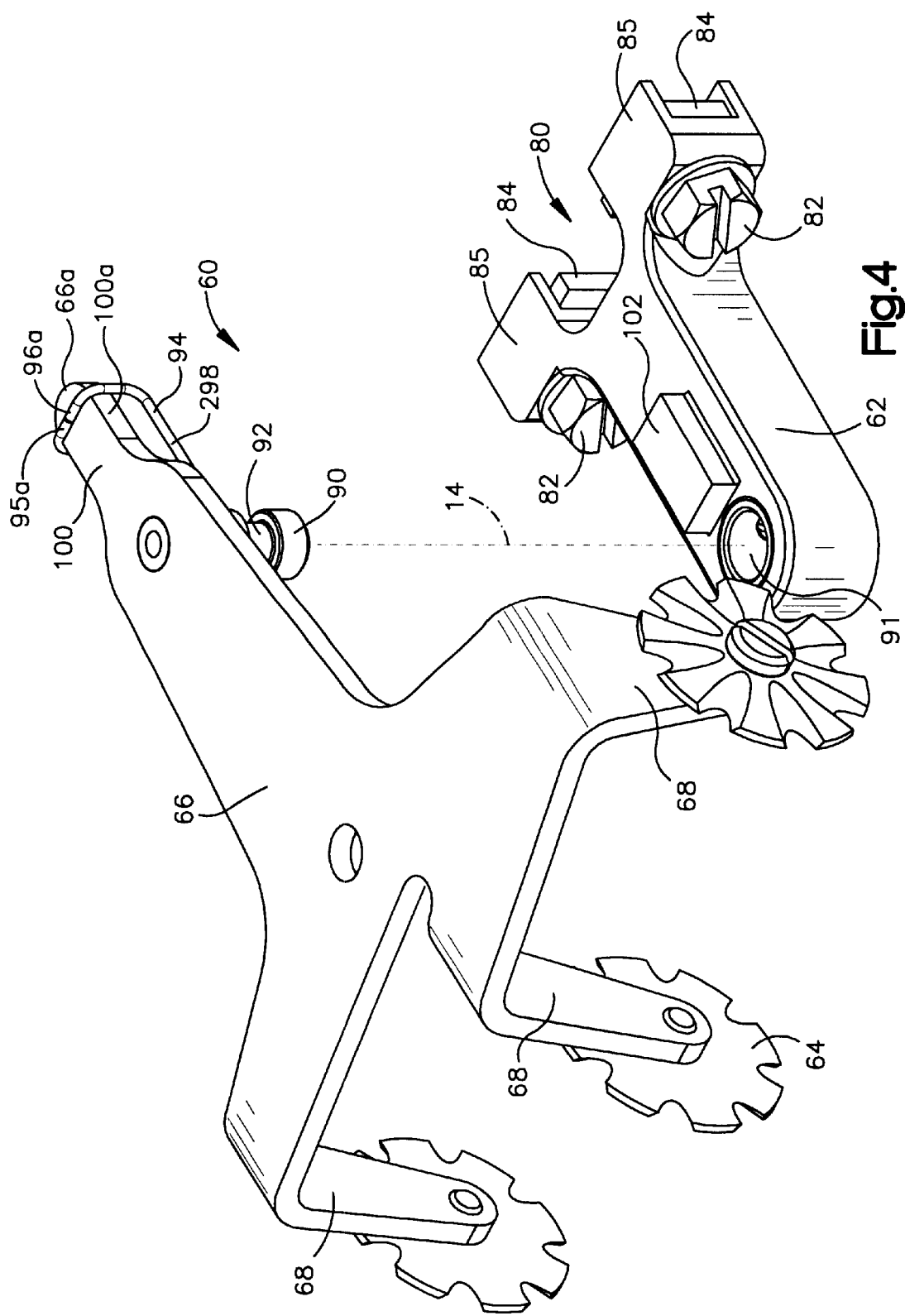
FIG. 4 is an exploded perspective view of the depth limiting attachment shown in FIG. 3.

As seen most clearly in FIG. 4, the mounting assembly 62 is shaped in the form of a yoke at one end. A cutout 80 is defined by a surface of the mounting assembly 62 that faces the clamp assembly to accommodate positioning of the straightening steel 52 with respect to the blade 12. The mounting assembly 62 includes screws 82 and clamping plates 84 that coact to detachably secure the mounting assembly 62 to the clamping assembly 34. The screws 82 freely extend through bores in arms 85 of the yoke-like mounting assembly. The clamping plates 84 are rectangular and each defines a tapped hole for receiving a respective screw 82.

To attach the mounting assembly 62 to the knife 10, the two clamping plates 84 are slipped into a respective recess or slot 86 formed in the clamp assembly 34 that are formed by shoe-like projections 87 which extend outwardly from opposite sides of the steel support body 53. The plate ends that are nearest the steel support body 53 extend into undercuts that extend along the support body 53 on its opposite sides to clamp the assembly 62 to the handle. When the screws 82 that have been threaded into the clamping plates 84 are tightened, each respective plate engages its associated undercut and clamps the depth limiting attachment 60 in place. Loosening the screws allows the mounting assembly to be slid up and down along the guide slots 86 to a desired location. This adjustment, in turn, defines a depth to which the knife 10 can remove fat from a piece of meat. As seen in the depiction of the knife 10 shown in FIG. 2 the spacing S between a first contact of the wheels that form the gauges and the knife blade 12 is controlled by the adjustment of the position of the mounting assembly 62 along the slots 86.

Regardless of the orientation of the knife, it is desirable that the wheels align generally with a direction of an elongated axis of the handle assembly 20 until the knife blade 12 is brought into contact with the meat. After this contact occurs the base is allowed to pivot from this "home" orientation that is shown in FIG. 1 to an orientation in which the base 66 has pivoted about the axis 14 such as the orientation shown in FIG. 1A.

Extending downwardly from the base 66 is a post 90 that fits into a corresponding opening 91 in the mounting assembly 62. The post 90 includes a circumferential groove 92 that extends around its outer circumference. A threaded connector 93 (FIG. 3) extends into the cutout of the yoke portion 80 of the mounting assembly 62 and threads into the mounting assembly so that an end of the connector 93 fits within the groove 92 to maintain the base 66 and mounting assembly 62 connected while allowing relative rotation of the base 66 with respect to the mounting assembly 62 during use of the knife.

Figure 7:
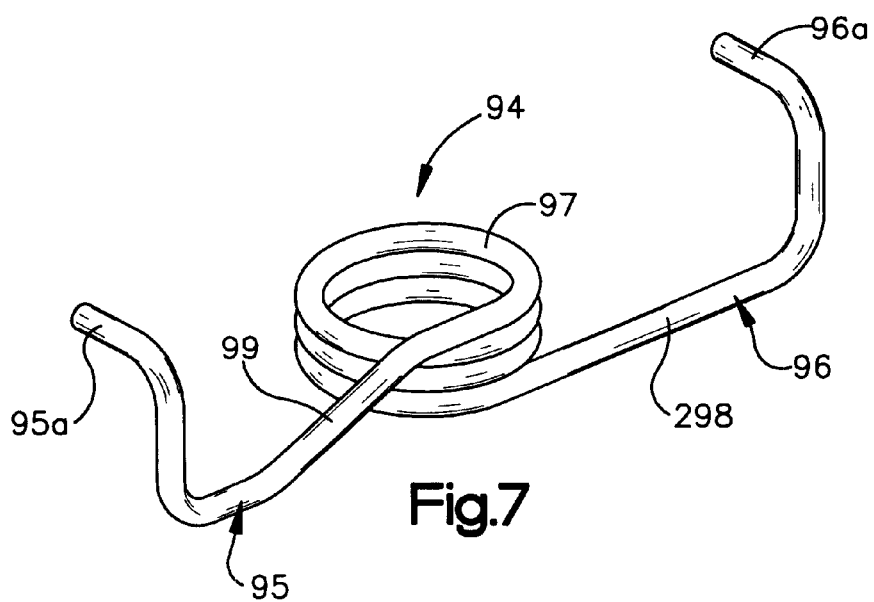
FIG. 7 is a perspective view of a spring that helps orient the depth limiting attachment during use of the rotary knife by an operator.

Pivoting of the base 66 and wheels 64 about the axis 14 occurs during operator manipulation of the knife 10. A spring 94 (FIG. 7) that is mounted to the post 90 allows the mounting assembly 62 to pivot about the "home" position depicted in FIG. 1 to a position (FIG. 1A) wherein which the base 66 has pivoted to one side as the knife is moved with respect to a piece of meat. The spring 94 is depicted in FIG. 7 before a preload is applied. As depicted in FIG. 7 the spring 94 has two oppositely extending arms 95, 96 connected by a coiled center portion 97. During assembly, the coiled center portion of the spring 94 is slipped over the post 90 so that the spring's coiled center portion 97 moves past the groove 92 in the post 90. A preload is applied to the spring 94 by bending the arms so that two ends 95a, 96a of the spring fit over a narrow tang 100 of the mounting assembly 66. When this preload is applied, one end 96a of the spring is connected to an elongated spring section 298 that extends along, but is spaced beneath one side 100a of the tang 100. The other end 95a of the spring is connected to an elongated spring section 99 that extends along, but is spaced beneath the opposite side 100b of the tang 100. The end portions 95a, 96a of the spring extends over a top surface 66a of the tang 100 and abut each other as illustrated in FIG. 4 for example.

With the spring installed over the post, the base 66 and the mounting assembly 62 are connected together and the entire attachment 60 is connected to the knife 10. As the user manipulates the knife 10, the weight of the attachment 60 as well as the force of engagement between the wheels and the meat cause the base 66 to pivot. When this occurs, one or the other of the elongated sections 298 or 99 of the spring engages a side of a generally rectangular boss 102 that defines a raised region of the mounting assembly 62. This engagement limits further pivoting of that end of the spring. Continued rotation of the base deforms the spring 94 causing the preloaded spring to exert a restoring force against the base 66.

Rotation of the base 66 about the axis 14 has taken place in the knife depiction of FIG. 1A. The attachment 60 continues to serve its function of controlling the depth to which the knife blade slices off fat. The further the base 66 rotates, the greater the restoring force exerted by the spring 94. If the knife is lifted off the surface of the meat that is being cut, the restoring force of the spring 94 is sufficient to move the attachment back to its home position that is shown in FIG. 1.

As shown in the Figures, the knife 10 also includes a conventional grease cup assembly 98. The grease cup assembly is screwed into a tapped hole in the head member and supplies lubricant to the pinion gear area via passages in the head member.

An alternate embodiment of a power operated rotary knife 110 embodying the invention is illustrated in FIGS. 8–11 of the drawings. The knife 110 comprises an annular blade 112 that is mounted for rotation about a central axis 114 by a blade support assembly 116. A user or operator manipulates the blade by grasping a handle assembly 120 connected to the blade support assembly 116 and bringing the rotating blade 112 into contact with a material such as an exposed surface of a piece of meat.

The blade 112 is rotated by a motor located a distance from the knife. The motor is coupled to the blade by means of an elongated flexible blade drive 22 (FIG. 12) that extends into the handle assembly 120 at an end of the handle assembly spaced from the blade 112. The flexible blade drive 22 is supported within a liner 124 having a passageway 125 which extends through the handle assembly. An end of the flexible shaft is coupled to a blade driving pinion gear 126 rotatably supported in a sleeve bearing 127 shown most clearly in FIG. 10. The liner 124 includes a threaded end 128 that engages a correspondingly threaded end cap 129 that holds the handle assembly 120 in place during operation of the knife 110. Different operators can use the knife so that different handle assemblies can be interchanged with each other by removing the end cap 129 and substituting a different handle assembly 120.

Figure 9:
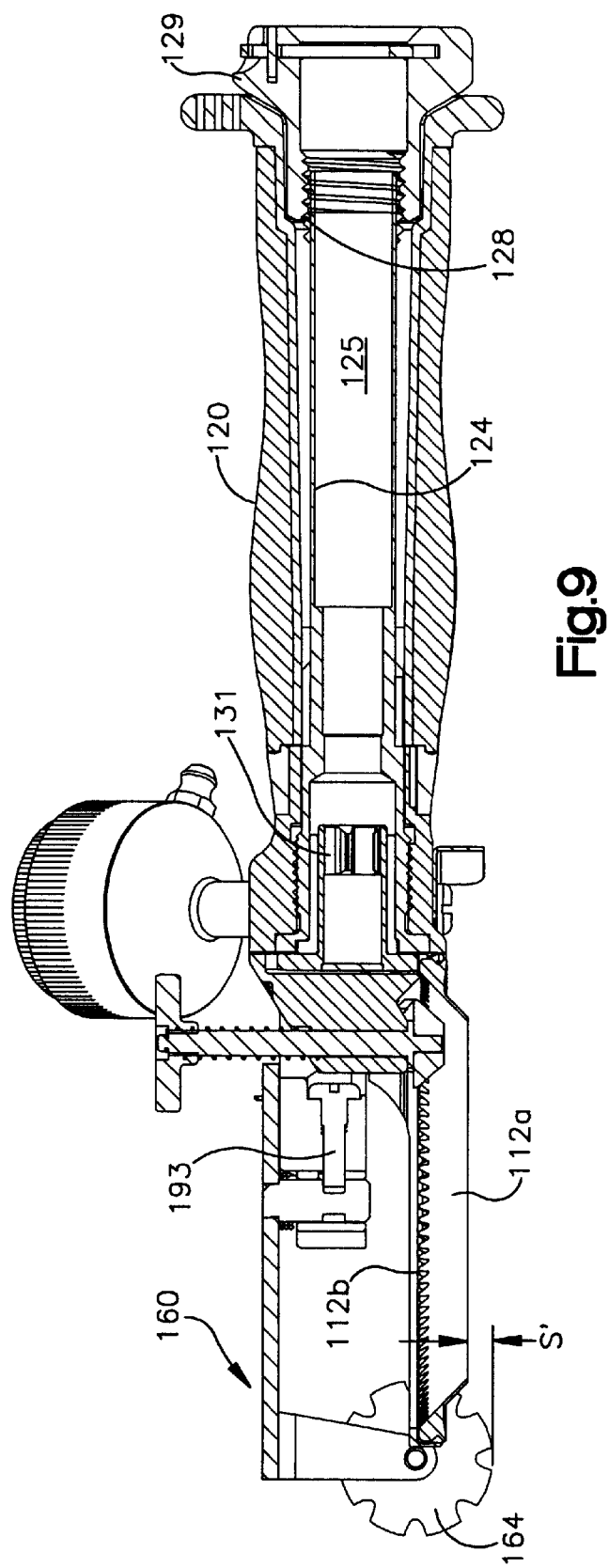
FIG. 9 is a cross sectional view seen approximately from the plane indicated by the line 8—8 of FIG. 9.
Figure 10:
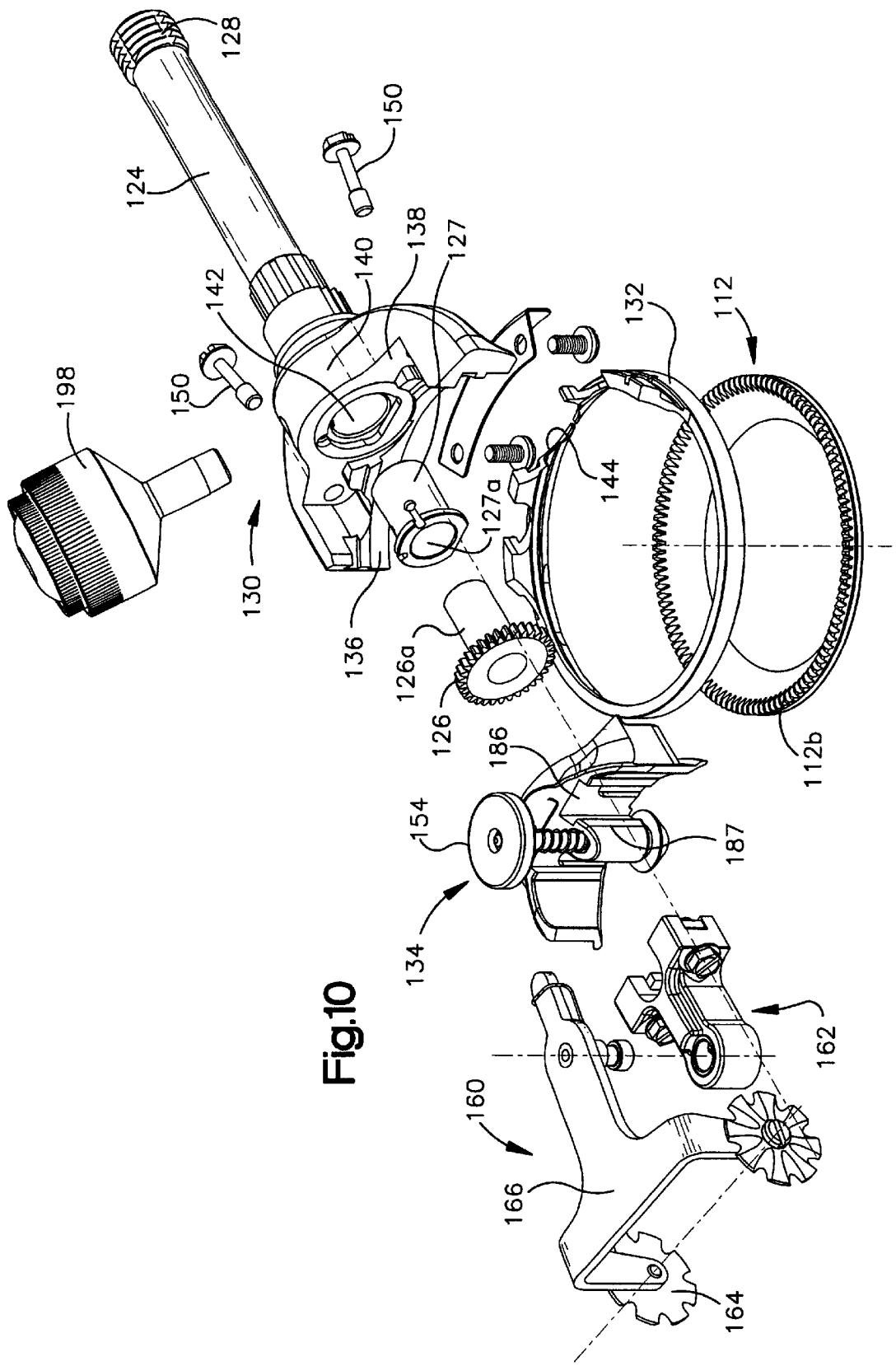
FIG. 10 is an exploded perspective view of part of the knife of FIG. 8 having a depth limiting attachment.
Figure 11:
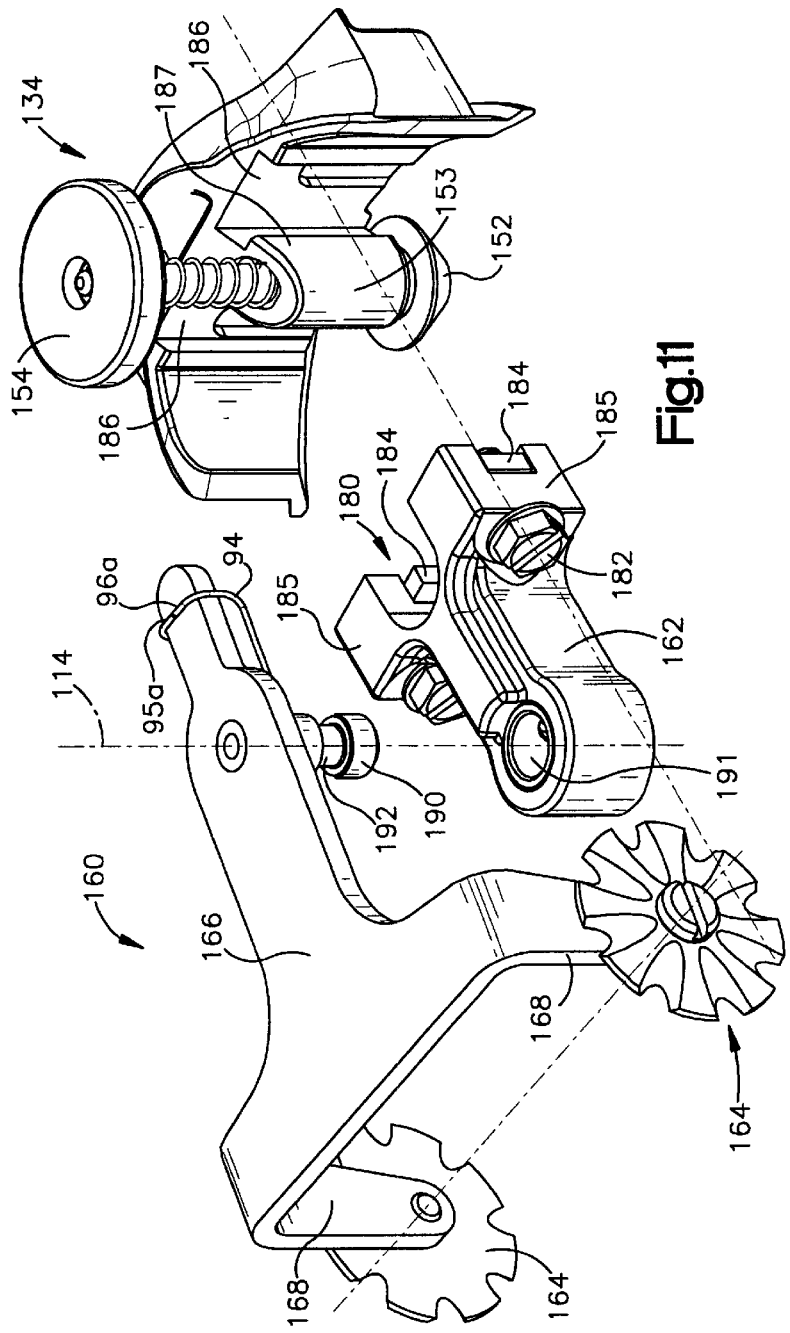
FIG. 11 is an exploded perspective view of the depth limiting attachment shown in FIG. 10.

The blade 112 may be of any suitable or conventional construction and includes an annular blade section 112a projecting from the blade support assembly 116 and an annular enlarged body section defining a ring gear 112b (see FIG. 9). The ring gear 112b has axially extending teeth by which the blade 112 is driven about the axis 114 in mesh with the pinion gear 126.

The blade support assembly 116 supports the blade 112 for movement with the handle assembly 120 as a user moves the handle assembly. The blade support assembly 116 includes a head member 130, a blade housing 132, and a clamp assembly 134 for securing the blade and blade housing to the head member. The head member is illustrated as formed by a generally crescent shaped body having a semicircular seating region 136 confronting the blade housing, a rectilinear clamp assembly receiving socket 138 adjacent the seating region, and an enlarged boss 140 that defines a through bore 142 in the head member.

The blade housing 132 is an annular member for receiving, and rotatably supporting, the blade 112. The blade housing is split to enable it to expand for removing and replacing the blade 112. The illustrated blade housing is seated against the head member seating region 136 and positions the blade 112 so that the ring gear 112b is accurately positioned for being driven from the pinion gear 126. The blade housing defines a semicircular cutout area 144 that receives the pinion gear 126 when the pinion gear and ring gear 112b mesh.

The through bore 142 in the head member 130 is sized to accommodate the sleeve bearing 127 which seats within the head member 130 and which has a center throughbore 127a to accept the pinion gear 126. The pinion gear rotates within the sleeve bearing 127 and includes a shaft portion 126a having a splined interior passageway 131 which mates with an end of the flexible blade drive 22 which imparts rotation to the pinion gear 126.

The pinion gear is held in place by the clamp assembly 134. This clamp assembly 134 has two threaded openings which face the head member 130. Threaded connectors 150 pass through the head member 130 and engage these threaded openings in the clamp assembly 134 to secure the clamp assembly to the head member 130. When so secured the clamp assembly fixes the pinion gear 126 and blade housing to the head assembly so that the pinion gear 126 is aligned with the teeth of the blade's ring gear 112b.

A blade straightening steel 152 is supported by the clamp assembly 134 in spaced relation to the blade. This steel is connected to a button actuator 154 mounted to a steel support body 153. By depressing the actuator 154 a beveled surface of the steel 152 is brought into contact with the blade 112 to periodically straighten a circular cutting edge of the blade.

The knife 110 depicted in FIGS. 8–11 includes a cut depth limiting attachment 160. This attachment includes a mounting assembly 162 that is adapted to be connected to a mounting surface of the knife's clamp assembly. A number of depth of cut limiting gauges 164 are connected to a base 166 pivotally connected to the mounting assembly 162 for rotation about an axis of rotation 114 that generally coincides with the axis of rotation of the blade. In the embodiment illustrated in FIGS. 8–11 the base 166 includes two gauge mounting arms 168 that extend outwardly away from the axis beyond an outer circumference of the rotating blade 112.

The mounting assembly 162 is shaped in the form of a yoke at one end. A cutout 180 is defined by a surface of the mounting assembly 162 that faces the clamp assembly to accommodate positioning of the straightening steel with respect to the blade 112. The mounting assembly 162 includes screws 182 and clamping plates 184 that coact to detachably secure the mounting assembly 162 to the clamping assembly 134. The screws 182 freely extend through bores in arms 185 of the yoke-like mounting assembly. The plates 184 are rectangular and each defines a tapped hole for receiving a respective screw 182.

To attach the mounting assembly 162 to the knife 110, the two plates 184 are slipped into a respective recess or slot 186 formed in the clamping assembly that are formed by shoe-like projections 187 which extend from opposite sides of a steel support body 153. The plate ends that are nearest the steel support body 153 extend into undercuts that extend along the support body 153 on its opposite sides. When the screws 182 that have been threaded into the plates 184 are tightened, each respective plate engages its associated undercut and clamps the depth limiting attachment 160 in place. Loosening the screws allows the mounting assembly to be slid along the guide slots 86 to a desired location. This adjustment, in turn, defines a thickness of fat which the knife 10 leaves on a piece of meat. As seen in the depiction of the knife 110 shown in FIG. 9 the spacing S' between a first contact of the wheels that form the gauges and the knife blade 112 is controlled by the adjustment of the mounting assembly along the slots 186.

Figure 8:
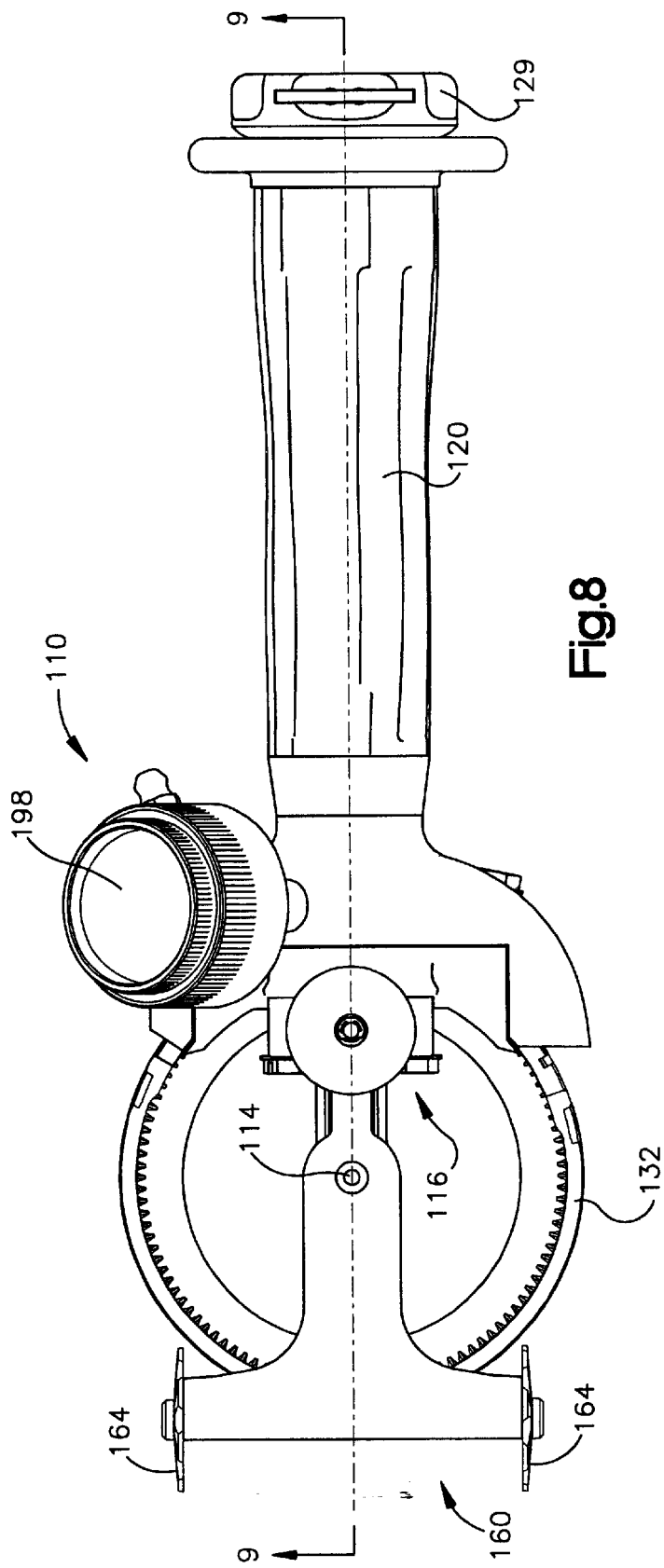
FIG. 8 is a top plan view of a knife constructed according to an alternate embodiment of the invention.

Regardless of the orientation of the knife, it is desirable that the wheels align generally with a direction of an elongated axis of the handle assembly 120 until the knife blade 112 is brought into contact with the fat. After this contact occurs the assembly 160 is allowed to pivot from this "home" orientation that is shown in FIG. 8 to a position in which the assembly 160 has pivoted about the axis 114. This pivoting allows the user to direct the knife in any direction while allowing the depth limiting assembly to perform its function.

Extending downwardly from the base 166 is a post 190 that fits into a corresponding opening 191 in the mounting assembly 162. The post 190 includes a circumferential groove 192 that extends around its outer perimeter. A threaded connector 193 (FIG. 9) extends into the cutout of the yoke portion of the mounting assembly 162 so that an end of the connector fits within the groove 192 to maintain the base 166 and mounting assembly 162 connected while allowing relative rotation of the base with respect to the mounting assembly during use of the knife. The second illustrated embodiment of the invention includes the spring 94 for allowing limited pivoting of the base 162. Its construction and operation is identical to the spring described above in relation to the first embodiment of the invention.

As shown in the Figures, the knife 110 also includes a conventional grease cup assembly 198. The grease cup assembly is screwed into a tapped hole in the head member and supplies lubricant to the pinion gear area via passages in the head member.

Figure 12:
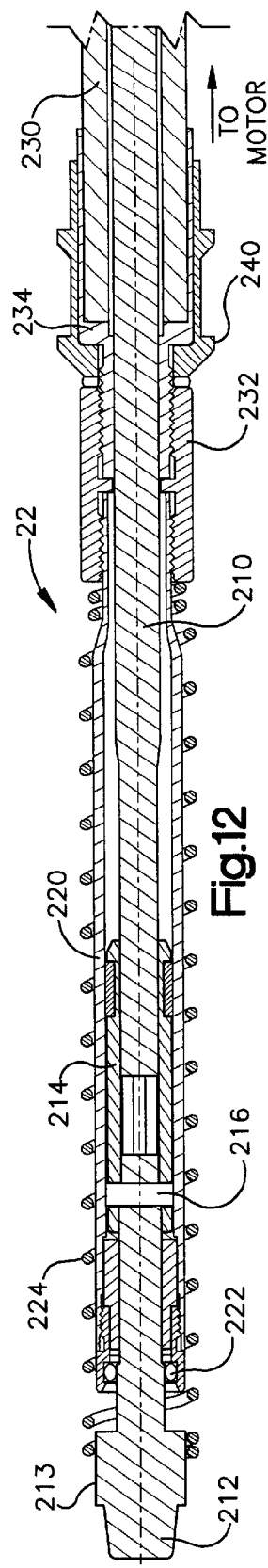
FIG. 12 is a section view of a drive for applying rotational motion to a knife blade supported by a blade housing.

The blade drive 22 for rotating the blades 12, 112 is depicted in greater detail in FIG. 12. A flexible drive shaft 210 has one end that can be connected to a drive motor (not shown) and a second distal end connected to a fitting 212 that engages the knife's pinion gear 26. The fitting 212 defines outwardly extending ridges 213 that are inserted into the splined passageway 131 of the pinion gear 126. Rotation imparted to the fitting 212 by the drive shaft 210 causes the pinion gear 26 rotate and in turn rotate the blades 12, 212. The drive shaft 210 and the fitting 212 are connected together by a coupling 214 fixed to the fitting 212 by means of a pin 216. A metal tube 220 surrounds the coupling and supports a seal 222 that inhibits water in the region of the blade from entering the tube 220 as well as inhibiting lubricant inside the tube from leaking out. The tube 220 is surrounded by a coiled spring 224 that compresses as a distal end of the blade drive 22 is inserted into an opening in the handle's end cap 29.

FIG. 12 also depicts an elongated plastic casing 230 supporting the drive shaft 210 along its length for rotation about a longitudinal axis of said drive shaft 210. The plastic casing 230 defines a tubular flexible conduit loosely surrounding the drive shaft 210. The plastic casing 230 and the metal tube 220 are connected together by a coupling 232 having a threaded interior which allows a corresponding threaded exterior end of the tube 220 to be connected to the coupling. The casing 230 is connected to a fitting 234 having a threaded exterior that mates with a second interior threaded portion of the coupling 232. The coupling also includes a retaining latch 240 which extends radially outward from the drive 22. When a distal end of the drive 22 is pushed into the handle this latch 240 fits into a circular groove 29a of the handle end cap 29 to retain the drive 22 in engagement with the knife 10.

Operation

One use of the depth limiting attachments 60, 160 is for controlling the amount of fat that is left on a piece of meat as the knife slices through the meat. A particular advantage that is achieved through use of the invention is in controlling the thickness of fat left on a recently slaughtered animal. As depicted in the drawings the gauges 64, 164 are formed by metal wheels that are rotatably supported and which include radially extend prongs 74 that enter the fat F as the knife blade cuts into the fat. As the user manipulates the knife handle and slices fat from the animal, the wheels rotate and will also pivot to the side with the attachment in response to contact with an exposed meat surface. The prongs enter the exposed fatty regions until the prongs come into contact with a fascia or silver skin layer SK (FIG. 13) that sheaths the meat. The meat and silver skin are firm and impenetrable compared to the fat layer so that they block further penetration by the gauges 64, 164. By adjusted the spacing S, S' between the blade 12 and the outer diameter of wheels that define the gauges, the knife 10 will trim a layer of fat while leaving a specified thickness S layer of fat on the meat.

Figure 13:
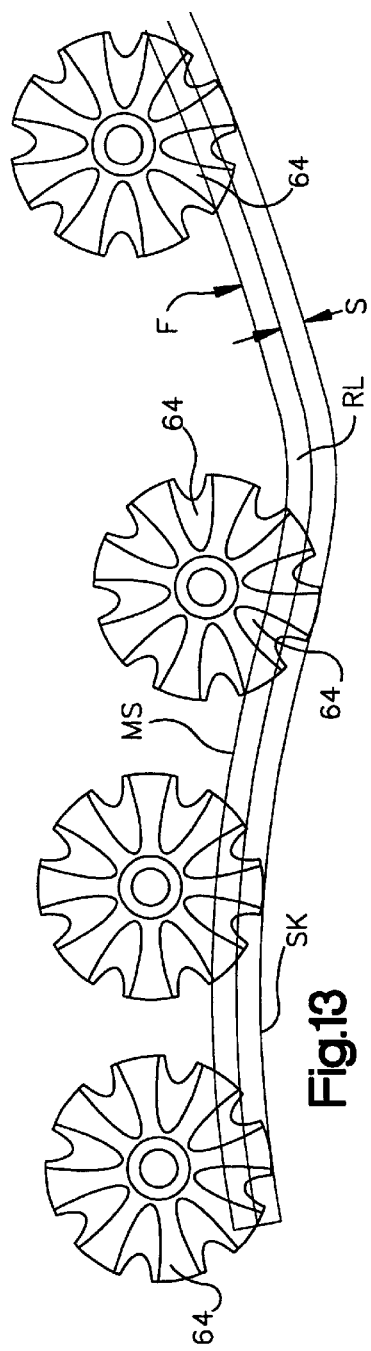
FIG. 13 is a schematic depiction showing operation of the depth limiting attachment in controlling a thickness of fat left on a piece of meat.

FIG. 13 schematically depicts an operator moving the knife 10 into contact with an exposed meat surface MS containing a layer of fat F to be trimmed, the prongs 74 of the wheels enter the layer of fat. As further pressure is exerted, the prongs continue to enter the fat until the prongs have pierced the fat to the depth of the meat's outer skin SK. Beyond this depth, the user experiences great difficulty in inserting the knife blade deeper into the meat. The outer contour of the meat depicted in FIG. 13 varies, but a uniform thickness S of fat is maintained across the surface of the meat. Note, the thickness of the removed layer RL can change due to variations in the thickness of the fat layer F but the amount of fat remaining is relatively constant.

Two embodiments of the invention have been illustrated and described. It is understood that various adaptations, modifications, and uses of the invention may occur to those skilled in the art to which the invention relates. The intention is to cover hereby, all such adaptations, modifications, and uses that fall within the scope or spirit of the appended claims.

What is claimed is:

1. A rotary knife comprising:
   an annular blade having a cutting edge that extend around at least a portion of the annular blade;
   a blade support that supports said blade for rotation about an axis of rotation;
   a manually grippable handle assembly connected to said blade support for allowing an operator to orient and move the blade to cut an exposed surface of meat and/or fat material with the annular blade;
   a drive transmission that engages the blade for driving said blade about said axis; and
   a cut depth limiting device mounted for movement with the handle assembly during movement of the knife, said depth limiting device including a gauge which includes one or more prongs which enter the material during operation of the rotary knife to limit a depth to which the blade enters the material;
   wherein the depth limiting device comprises a position adjustable base that supports the cut depth limiting device and attaches to the handle assembly for adjusting a position of the cut depth limiting device with respect to the blade;
   wherein said gauge comprises one or more rotatable wheels supported by the base, said wheels including radially extend prongs that enter said meat and/or fat material as the knife blade cuts off material leaving a controlled thickness of said material.

2. The rotary knife of claim 1 additionally comprising a support assembly that is attached to the handle assembly and pivotally supports the base of said depth limiting device.

3. The rotary knife of claim 1 additionally comprising a spring that biases the base to a preferred alignment while allowing the base to pivot about a pivot axis during operator manipulation of the rotary knife.

4. The rotary knife of claim 1 wherein the wheels comprise a relatively thick center hub section and a series of circumferentially spaced apart lands which extend outwardly from the hub section to an outer diameter of said wheel.

5. The rotary knife of claim 4 wherein the lands of said wheels taper from the relatively thick center hub section to a smaller thickness at the outer diameter of said wheel.

6. The rotary knife of claim 4 wherein the wheels include spaced apart cutouts which separate adjacent lands from each other around the periphery of said wheel.

7. The rotary knife of claim 6 wherein the spaced apart cutouts form notches that are spaced about an outer circumference of said wheels.

8. The rotary knife of claim 1 wherein the base is mounted to the handle assembly in a position spaced above the blade and further wherein the base extends outwardly from the handle assembly and includes one or more arms that extend beyond a region of contact between the blade and the exposed meat and/or fat surface.

9. The rotary knife of claim 1 wherein the base is mounted to the handle assembly by a base mounting assembly for adjusting a position of the cut depth limiting device with respect to a plane defined by the annular blade of said knife to control a thickness of fat left on the meat by the blade as it passes through the fat.

10. The rotary knife of claim 11 wherein the base mounting assembly comprises a clamp for engaging a clamp surface of the handle assembly and further includes connectors which when tightened fix the base mounting assembly in relation to the blade.

11. A method for trimming fat from meat comprising:
    supporting an annular blade having a cutting edge that extend around at least a portion of the annular blade for rotation about an axis of rotation in a blade housing;
    mounting the blade housing and said annular blade to a manually grippable handle assembly to allow an operator to orient and move the blade into contact with an exposed surface of a piece of meat;
    connecting a cut depth limiting device to the handle assembly, said depth limiting device including a gauge which penetrates fat during operation of the rotary knife to limit a depth to which the blade enters a layer of fat on the surface of said meat;
    coupling the blade to a power source and driving said blade about its axis of rotation; and
    moving the handle to trim fat from the meat while leaving a layer of fat defined by a position of said gauge;
    wherein the depth limiting device is pivotally attached to the handle assembly to allow the depth limiting device to pivot during manipulation of said device.

12. The method of claim 11 wherein the depth limiting device is biased to a preferred orientation with respect to the handle assembly.

13. The method of claim 11 wherein the depth limiting device includes a base that attaches to the handle assembly and which extends outwardly away from the handle assembly beyond a region of contact between the blade and the meat and wherein the base supports wheels which include radially extend prongs that enter the fat in a region removed by the annular blade thereby limiting a thickness of fat trimmed from the meat by said blade.

14. A motor operated knife comprising:
    a blade having a cutting edge that extends along at least a portion of the blade;

a blade support assembly supporting said blade for movement as the blade is brought into contact with a material;

a manually grippable handle assembly connected to said blade support assembly for allowing an operator to orient and move the blade to cut material on an exposed surface;

a drive transmission that engages the blade for driving said blade during manipulation of the knife; and a cut depth limiting device mounted for movement with the handle assembly during manipulation of the knife, said depth limiting device including a gauge which includes one or more prongs which enter the material during operation of the knife to limit a depth to which the blade enters the material;

wherein a depth limiting device base is mounted to the handle assembly in a position spaced above the blade and further wherein the base extends outwardly from a location where the base is attached to the handle assembly to a region of contact between the blade and the material where the prongs enter the material as the blade cuts into said material;

wherein said gauge comprises one or more rotatable wheels supported by the base, said wheels including radially extend prongs that enter the material as the knife blade cuts off a thickness of material to leave a desired thickness of uncut material.

15. The knife of claim 14 wherein the base is mounted to the handle assembly by a base mounting assembly for adjusting a position of the cut depth limiting device with respect to a plane defined by the blade of said knife to control a thickness of cut by the blade as it passes through the material.

16. The knife of claim 14 wherein the base is pivotally mounted to the handle assembly by a base mounting assembly which adjusts a position of the cut depth limiting device with respect to a cutting plane of said knife to control a depth of cut by the blade as it passes through the material.

17. A cut depth limiting attachment for use with a hand held knife comprising:

a) a mounting assembly adapted to be connected to a knife handle assembly which supports a cutting blade for movement with the knife during manipulation of the knife;

b) base pivotally connected to the mounting assembly for rotation about an axis of rotation and including a base portion that extends within or beyond the blade; and c) one or more depth limiting gauges connected to the base portion which enter material that is to be trimmed during operation of the knife for limiting a thickness of material remaining after the blade passes over a surface of the material as the knife is moved relative to the material.

18. The attachment of claim 17 wherein the gauge comprises one or more rotatable wheels supported by the base, said wheels including radially extend prongs that enter the material as the knife blade cuts into the material.

19. The attachment of claim 18 wherein each wheel comprises a relatively thick center hub section and a series of circumferentially spaced apart lands which extend outwardly from the hub section to an outer diameter of said wheel.

20. The attachment of claim 18 wherein the lands of each wheel taper from the relatively thick center hub section to a smaller thickness at the outer diameter of said wheel.

21. The attachment of claim 20 wherein each wheel includes spaced apart cutouts which separate adjacent lands from each other around the periphery of said wheel and include edges which cut into fat on a piece of meat to allow an outer diameter of the wheel to contact a layer within the meat.

22. The attachment of claim 21 wherein the spaced apart cutouts form notches that are spaced about an outer circumference of each wheel.

23. The attachment of claim 17 additionally comprising a spring that biases the base to a preferred alignment while allowing the base to pivot about a pivot axis during operator manipulation of the knife and return to its original home position once it is disengaged.

24. The attachment of claim 17 wherein the mounting assembly includes an adjustable clamp for adjusting a position of the one or more depth limiting gauges with respect to a plane defined by the blade of said knife to control a thickness of cut by the blade as it passes through the material.

25. A cut depth limiting apparatus for use with a hand held knife comprising:

a) a mounting assembly adapted to be connected to a knife handle assembly which supports a cutting blade for movement with the knife during manipulation of the knife;

b) a base pivotally connected to the mounting assembly for rotation about an axis of rotation and including a base portion that extends within or beyond the blade; and c) one or more depth limiting gauges connected to the base portion which enter material that is to be trimmed during operation of the knife for limiting a thickness of material remaining after the blade cuts through the material as the knife is moved relative to the material.

26. The apparatus of claim 25 wherein the gauge comprises one or more rotatable wheels supported by the base, said wheels including radially extend prongs that enter the material as the knife blade cuts through the material.

27. The apparatus of claim 26 wherein each wheel comprises a relatively thick center hub section and a series of circumferentially spaced apart lands which extend outwardly from the hub section to an outer diameter of said wheel.

28. The apparatus of claim 26 wherein the lands of each wheel taper from the relatively thick center hub section to a smaller thickness at the outer diameter of said wheel.

29. The apparatus of claim 26 wherein each wheel includes spaced apart cutouts which separate adjacent lands from each other around the periphery of said wheel and include edges which cut into fat on a piece of meat to allow an outer diameter of the wheel to contact a layer within the meat.

30. The apparatus of claim 29 wherein the spaced apart cutouts form notches that are spaced about an outer circumference of each wheel.

31. The apparatus of claim 25 additionally comprising a spring that biases the base to a preferred alignment while allowing the base to pivot about a pivot axis during operator manipulation of the knife and return to its original home position once it is disengaged.

32. The apparatus of claim 25 wherein the mounting assembly includes an adjustable clamp for adjusting a position of the one or more depth limiting gauges with respect to a plane defined by the blade of said knife to control a thickness of cut by the blade as it cuts through the material.

* * * * *